(12) United States Patent
Sawhney

(10) Patent No.: US 9,935,908 B2
(45) Date of Patent: Apr. 3, 2018

(54) DOWNLOAD OF CURRENT PORTIONS OF EMAIL MESSAGES

(71) Applicant: Microsoft Technology Licensing, LLC, Redmond, WA (US)

(72) Inventor: Ishdeep Sawhney, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/666,209

(22) Filed: Mar. 23, 2015

(65) Prior Publication Data

US 2015/0195238 A1 Jul. 9, 2015

Related U.S. Application Data

(63) Continuation of application No. 12/060,568, filed on Apr. 1, 2008, now Pat. No. 8,990,313.

(51) Int. Cl.
*G06F 15/16* (2006.01)
*H04L 12/58* (2006.01)
*G06Q 10/10* (2012.01)

(52) U.S. Cl.
CPC .......... *H04L 51/22* (2013.01); *G06Q 10/107* (2013.01); *H04L 51/063* (2013.01)

(58) Field of Classification Search
None
See application file for complete search history.

(56) References Cited

U.S. PATENT DOCUMENTS

| | | |
|---|---|---|
| 5,487,100 A | 1/1996 | Kane |
| 5,956,509 A | 9/1999 | Kevner |
| 7,035,876 B2 | 4/2006 | Kawai et al. |
| 7,064,688 B2 * | 6/2006 | Collins .................. H03M 7/30 341/106 |
| 7,293,064 B1 | 11/2007 | Lundy et al. |
| 8,112,482 B1 | 2/2012 | Geddes |
| 8,990,313 B2 | 3/2015 | Sawhney |
| 2003/0177190 A1 | 9/2003 | Moody et al. |
| 2003/0224760 A1 | 12/2003 | Day |

(Continued)

FOREIGN PATENT DOCUMENTS

WO 2006/076812 A1 7/2006

OTHER PUBLICATIONS

Mawes, Stephane H., White Paper Title: Oracle Mobile Push Mail Technical Vision, Oracle®, Jul. 2005, 18 pages.

(Continued)

*Primary Examiner* — Joshua Joo
(74) *Attorney, Agent, or Firm* — Merchant & Gould

(57) ABSTRACT

In general, this disclosure describes techniques of enabling devices to download only current portions of email messages without downloading historical portions of the email messages. For instance, when an email client generates a reply email message to an original email message, the reply email message includes a current portion and a historical portion. The current portion of the reply email message includes new information and the historical portion of the reply email message includes the original email message. The techniques of this disclosure enable devices to download the current portions of email messages without downloading the historical portions of the email messages.

17 Claims, 6 Drawing Sheets

(56) References Cited

U.S. PATENT DOCUMENTS

| | | |
|---|---|---|
| 2004/0044735 A1 | 3/2004 | Hoblit |
| 2004/0078334 A1 | 4/2004 | Malcolm et al. |
| 2004/0090457 A1 | 5/2004 | Serdy |
| 2004/0236834 A1 | 11/2004 | Kreitzer |
| 2006/0020668 A1 | 1/2006 | Chen et al. |
| 2006/0161849 A1 | 7/2006 | Miller |
| 2006/0224750 A1 | 10/2006 | Davies |
| 2006/0277257 A1 | 12/2006 | Kromann |
| 2007/0027954 A1 | 2/2007 | Chen et al. |
| 2007/0113101 A1 | 5/2007 | LeVasseur et al. |
| 2007/0143277 A1 | 6/2007 | Van De Laar |
| 2008/0014910 A1 | 1/2008 | Hsu |
| 2008/0109462 A1* | 5/2008 | Adams ............... G06Q 10/107 |
| 2011/0258707 A1 | 10/2011 | Brown et al. |
| 2012/0245937 A1 | 9/2012 | Thenthirperal et al. |

OTHER PUBLICATIONS

NexWave, Solutions Pte Ltd, Mobile Mail, Ericsson Mobile Organizer 5.1, © Ericsson Enterprises AB, 2005, 3 pages.

Tricastmedia, Tricast Mail, Tricast Mail features (Version 1.6.1) accessed Jan. 23, 2008, 2 pages, http://www.tricastmedia.com/tricastmail/?p=1.

* cited by examiner

DOWNLOAD OF CURRENT PORTIONS OF EMAIL MESSAGES

CROSS-REFERENCE TO RELATED APPLICATION

This application is a continuation of U.S. patent application Ser. No. 12/060,568, filed Apr. 1, 2008, entitled DOWNLOAD OF CURRENT PORTIONS OF EMAIL MESSAGES, and now U.S. Pat. No. 8,990,313, which is hereby incorporated by reference in its entirety.

BACKGROUND

Wireless handheld devices have become popular tools to check and send email messages because mobile wireless handheld devices can be used from practically anywhere. This makes wireless handheld devices ideal for businesspeople that are frequently away from their office computers, but need to stay in contact with their associates and clients.

However, wireless handheld devices can have several known shortcomings. These shortcomings include slow data transmission rates and limited battery lives. Moreover, wirelessly transmitting data consumes considerable amounts of energy, thereby further shortening the battery lives of wireless handheld devices. Consequently, sending and receiving lengthy email messages may quickly drain the batteries of wireless handheld devices.

SUMMARY

In general, this disclosure describes techniques of enabling devices to download only current portions of email messages without downloading historical portions of the email messages. For instance, when an email client generates a reply email message to an original email message, the reply email message includes a current portion and a historical portion. The current portion of the reply email message includes new information and the historical portion of the reply email message includes the original email message. The techniques of this disclosure enable devices to download the current portions of email messages without downloading the historical portions of the email messages.

In some, but not necessarily all, circumstances, downloading the current portions of email messages without downloading the historical portions of the email messages may result in faster access to the current portions of the email messages. In addition, in some, but not necessarily all, circumstances, downloading the current portions of email messages without downloading the historical portions of the email messages may result in less energy consumption because energy is not consumed to download the historical portions of the email messages.

The techniques of this disclosure may be conceptualized in many ways. For example, the techniques of this disclosure may be conceptualized as a method that comprises receiving, at a server, an original email message that is a child email message of a second email message, the original email message including a current portion and a historical portion, the current portion containing content not in the second email message and the historical portion containing a copy of the second email message. The method also comprises generating, at the server, a truncated email message that includes the current portion of the original email message and not the historical portion of the original email message. In addition, the method comprises transmitting the truncated email message.

In another example, the techniques of this disclosure may be conceptualized as a computer-readable medium that comprises instructions that, when executed by a device, cause the device to receive an incoming truncated email message associated with a first email message this is a child email message of a second email message, the first email message including a current portion and a historical portion, the current portion containing content not in the second email message and the historical portion containing a copy of the second email message, the incoming truncated email message including the current portion of the first email message and excluding the historical portion of the first email message. The instructions also cause the device to recover, after reception of the incoming truncated email message, the first email message. In addition, the instructions cause the device to cause a presentation device to present the first message.

In another example, the techniques of this disclosure may be conceptualized as a communication system that comprises a first email server, a second email server, a first client device, a second client device, and a network that facilitates communication between the first email server, the second email server, the and the first client device. The first client device comprises a network interface that enables the sending client device to send data on the network. In addition, the first client device comprises an incoming message module that receives a first email message. Furthermore, the first client device comprises an interface presentation module that receives a command from a user to send a second email message that includes a current portion and a historical portion that includes the first email message. The second email message is related to the first email message by a relationship selected from a group consisting of: (i) the second email message is a reply to the first email message; and (ii) the second email message is a forward of the first email message. The first client device also comprises an outgoing message module that includes a "portion partition" header field that indicates a start of the historical portion of the second email message. In addition, the first client device comprises a transmission module that causes the network interface of the first client device to send the second email message to the first email server via the network. The first email server sends the second email message to the second email server. The second email server comprises a network interface that enables the second email server to receive data from the network and to send data on the network. The second email server also comprises an incoming message module that receives the second email message. In addition, the second email server comprises a truncation module that (1) determines whether the second email message includes the "portion partition" header field; and (2) generates, when it is determined that the second email message includes the "portion partition" header field, a truncated email message that includes all of the second email message prior to the start of the historical portion of the second email message. The second email server also comprises a transmission module that causes the network interface of the second email server to forward the truncated email message to the second client device. The second client device comprises a presentation device that is capable of displaying data. The second client device also comprises a message cache that is capable of storing email messages. In addition, the second client device comprises an incoming message module that receives the truncated email message and stores the truncated email message in the message cache. Moreover, the second client device comprises an interface presentation module that causes the presentation device to present an interface that displays the truncated email message. In addition, the second client device comprises a message recovery module that: (i) determines whether the truncated email message includes a reference header field that specifies a message identifier; (ii) determines, when it is determined that the truncated email message includes the reference header field that specifies the message identifier, whether the message cache stores an email message that includes a message identifier header field that specifies a message identifier that is equal to the message identifier specified by the reference header field of the truncated email message; (iii) appends, when it is determined that the message cache stores the email message that includes the message identifier header field that specifies the message identifier that is equal to the message identifier specified by the reference header field of the truncated email message, the stored email message to the truncated email message, thereby reassembling the second email message; (iv) sends, when it is determined that the message cache does not store the email message that includes the message identifier header field that specifies the message identifier that is equal to the message identifier specified by the reference header field of the truncated email message or when it is determined that the truncated email message does not include the reference header field that specifies the message identifier, a request for the second email message; and (v) receives, in response to the request for the second email message, the second email message. After the message recovery module recovers the second email message, the interface presentation module causes the presentation device to display the second email message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
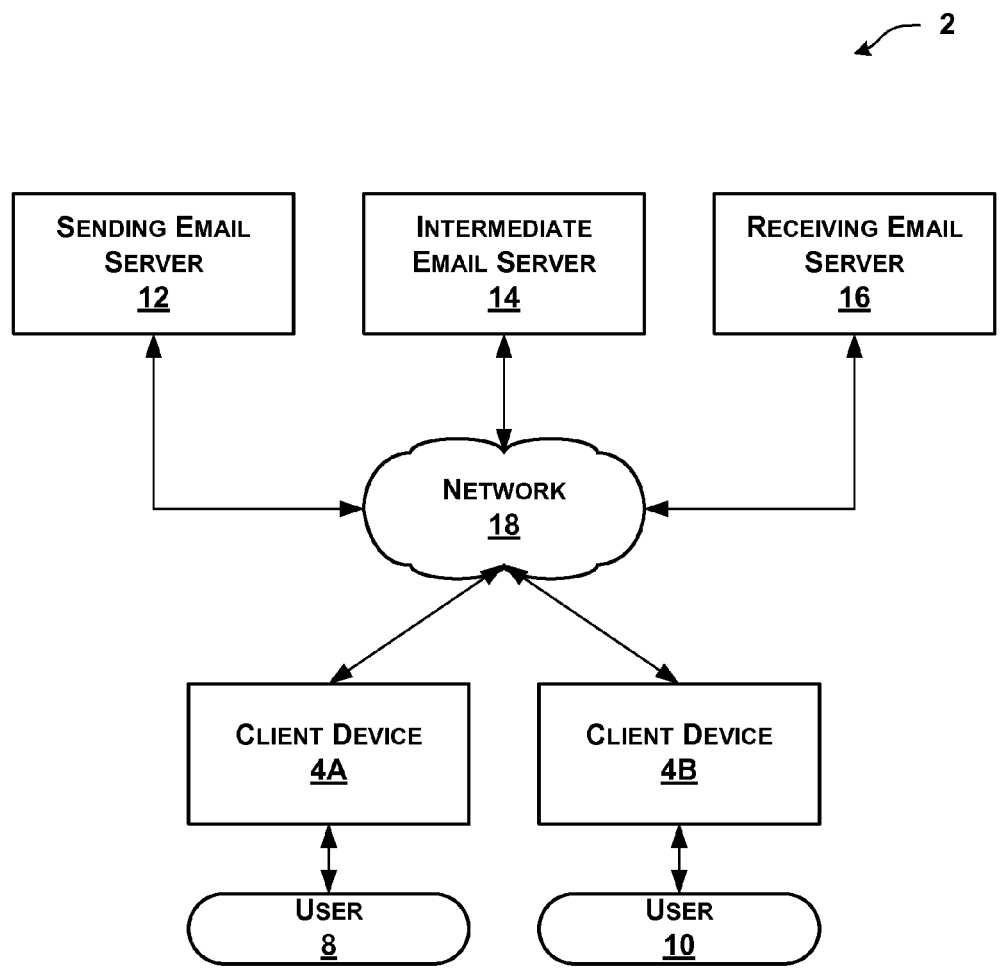
FIG. 1 is a block diagram illustrating an example communication system.

FIG. 1 is a block diagram illustrating an example communication system 2. FIG. 1 is provided for explanatory purposes only and is not intended to represent a sole way of implementing the techniques of this disclosure. Rather, many other implementations of these techniques are possible.

As illustrated in the example of FIG. 1, communication system 2 includes a client device 4A and a client device 4B. Client device 4A and client device 4B may be a wide variety of different types of devices. For example, client device 4A and/or client device 4B may be personal computers, mobile telephones, personal media players, smart phones, television set-top boxes, personal digital assistants, devices integrated into vehicles, mainframe computers, computer workstations, standalone servers, server blades, server farms, game platforms, or one or more other types of devices. A user 8 may use client device 4A and a user 10 may use client device 4B.

Furthermore, as illustrated in the example of FIG. 1, communication system 2 includes a sending email server 12, an intermediate email server 14, and a receiving email server 16. Sending email server 12, intermediate email server 14, and receiving email server 16 may be a variety of different types of devices. For instance, sending email server 12, intermediate email server 14, and/or receiving email server 16 may be standalone servers, server blades, server farms, personal computers, or other types of devices. Furthermore, it should be appreciated that the functionality of one or more of sending email server 12, intermediate email server 14, and/or receiving email server 16 may be performed by a single physical device. Moreover, in some implementations, no logical distinction is drawn between sending email server 12, intermediate email server 14, and/or receiving email server 16.

Communication system 2, in the example of FIG. 1, includes a network 18. Network 18 may be one of many different types of network. For instance, network 18 may be a local area network, a wide area network (e.g., the Internet), a global area network, a metropolitan area network, or another type of network. Network 18 may include many network devices and many network links. The network devices in network 18 may include bridges, hubs, switches, firewalls, routers, load balancers, and other types of network devices. The network links in network 18 may include wired links (e.g., coaxial cable, fiber optic cable, 10BASE-T cable, 100BASE-TX cable, etc.) and may include wireless links (e.g., WiFi links, WiMax links, wireless broadband links, mobile telephone links, Bluetooth links, infrared links, etc.).

User 8 may use client device 4A to send email messages. For example, client device 4A may execute an instance of a Microsoft OUTLOOK® messaging and collaboration client that enables user 8 to send and receive email messages. In another example, client device 4A may execute a web browser (e.g., Microsoft INTERNET EXPLORER® internet browser, Mozilla Firefox internet browser, Apple Opera internet browser, etc.) that presents an online email interface that enables user 8 to send and receive email messages.

When user 8 uses client device 4A to send an email message, client device 4A may send the email message to sending email server 12. Sending email server 12 may execute a mail transfer agent, such as Microsoft Exchange Server, a Simple Mail Transfer Protocol (SMTP) agent, or another type of mail transfer agent. For instance, when sending email server 12 executes a SMTP agent and the SMTP agent receives the email message, sending email server 12 may extract a domain name from an email address of a recipient of the email message. The mail transfer agent may then use a Domain Name System (DNS) to find Internet Protocol (IP) addresses of recipient mail transfer agents associated with the domain name. After finding an IP address of the recipient mail transfer agent, the SMTP agent may initiate a Transmission Control Protocol (TCP) session with the recipient mail transfer agent and use this TCP session to send the email message to the recipient transfer agent.

Intermediate email server 14 executes an instance of a mail transfer agent that accepts email message that specify email addresses that include a given domain name. For example, intermediate email server 14 may accept email messages that specify email addresses that include the domain name "example.com". In this example, when sending email server 12 receives an email message that specifies the email address "smith@example.com", sending email server 12 may send the email message to intermediate email server 14.

When intermediate email server 14 receives the email message (i.e., the original email message), intermediate email server 14 generates a truncated email message. The truncated email message is an email message that includes a current portion of the original email message and excludes a historical portion of the original email message.

As used in this disclosure, a first email message includes a current portion and a historical portion when the first email message is a child email message of a second email message. A child email message is an email message that is a reply to or a forward of another email message. The historical portion of the first email message contains a copy of the second email message and the current portion of the first email message contain content that is not in the second email message. It should be noted that the second email message may itself be a child email message of a third email message and may include a copy of the third email message as a historical portion. Consequently, the historical portion of the first email message may include a copy of the second email message and a copy of the third email message. For example, in the following email message, the portion above the first dashed line is the current portion of the email message and the portion below the first dashed line is the historical portion of the email message.

```
From: Kelly
Sent: Monday, March 03, 2008 11:42 AM
To: Justin
Subject: RE: RE: Lunch?
Let's go to Mario's at 12:30
-----------------------------------------------
    From: Justin
    Sent: Monday, March 03, 2008 11:42 AM
    To: Kelly
    Subject: RE: Lunch?
    Sure. Where do you want to go?
    -------------------------------------------
        From: Kelly
        Sent: Monday, March 03, 2008 11:38 AM
        To: Justin
        Subject: Lunch?
        Do you want to get lunch today?
```

As described in detail below, intermediate email server 14 may determine how to generate the truncated email message in a variety of ways. For example, the original email message may include a "portion partition" header field that indicates a start of the historical portion of the original email message. The "portion partition" header field may be one of the header fields of the original email message. In this example, intermediate email server 14 may use this "portion partition" header field to truncate all bytes of the original email message after the last byte of the current portion of the original email message, thereby generating the truncated email message. After intermediate email server 14 generates the truncated email message, intermediate email server 14 may forward the truncated email message to receiving email server 16.

When receiving email server 16 receives the truncated email message, receiving email server 16 may enable client device 4B to retrieve the truncated email message. Receiving email server 16 may enable client device 4B to retrieve the truncated email message in a variety of ways. For example, receiving email server 16 may enable client device 4B to receive the truncated email message wirelessly. In this example, receiving email server 16 may execute an instance of BlackBerry Enterprise Server produced by Research In Motion, Inc. of Waterloo, Ontario. Furthermore, in this example, the instance of BlackBerry Enterprise Server may push the truncated email message to client device 4B, which may be a wireless handheld device. In another example, receiving email server 16 may execute an instance of a Microsoft Exchange Server mail transfer agent that alerts an instance of Microsoft OUTLOOK® messaging and collaboration software executing on client device 4B that the truncated email message is available for retrieval. In response to such an alert, the instance of Microsoft OUTLOOK® messaging and collaboration software may retrieve the truncated email message.

Upon receiving the truncated email message, client device 4B may present the truncated email message to user 10. For instance, client device 4B may present a user interface that contains the truncated email message. In other instances, when client device 4B receives the truncated email message, client device 4B may dynamically recover the original email message. As described in detail below, client device 4B may dynamically recover the original email message in variety of ways.

Figure 2:
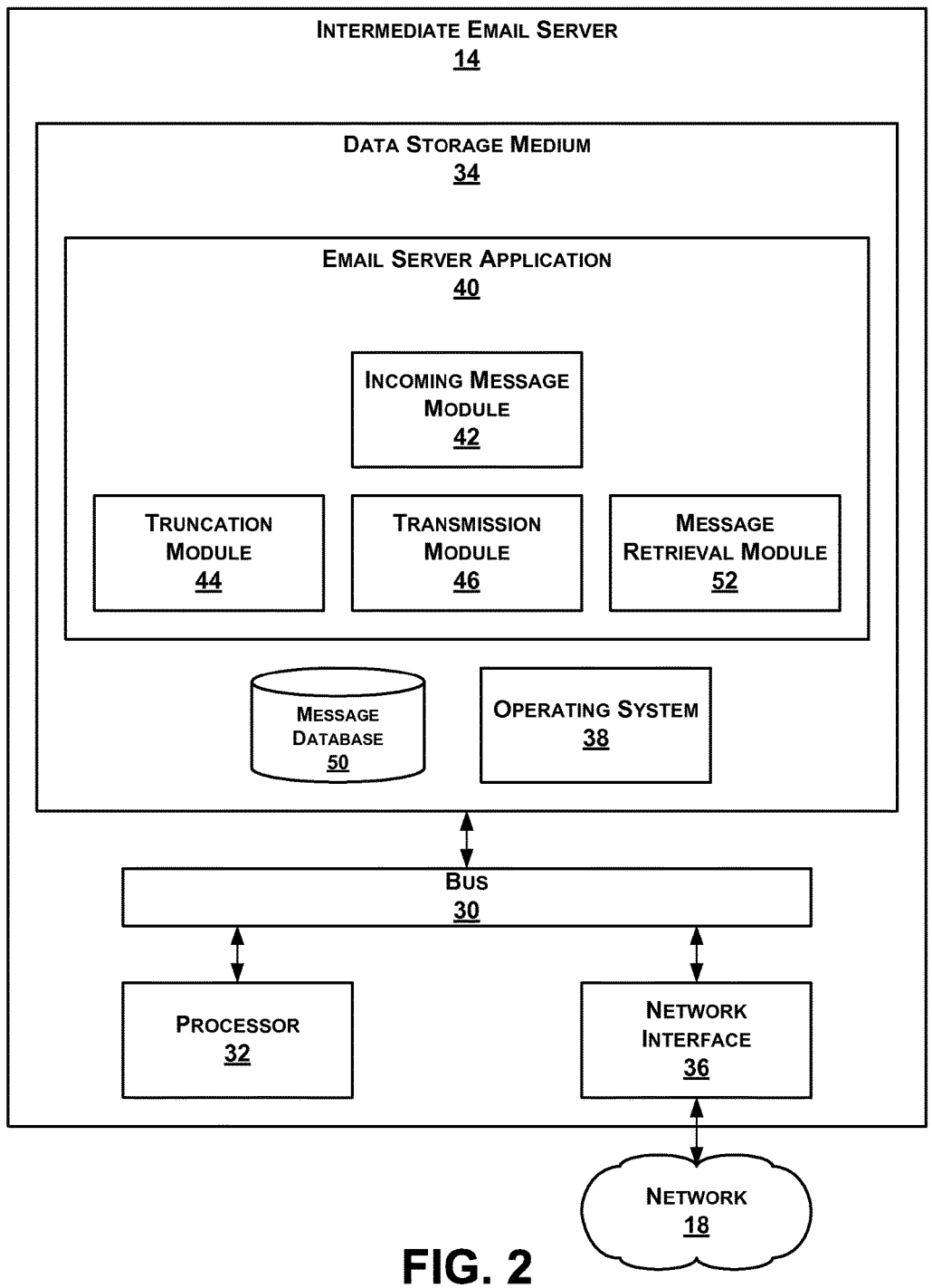
FIG. 2 is a block diagram illustrating example details of the intermediate email server illustrated in the example of FIG. 1.

FIG. 2 is a block diagram illustrating example details of intermediate server 14. FIG. 2 is provided for explanatory purposes and is not meant to represent a sole way of implementing intermediate email server 14. Furthermore, for ease of understanding, actual implementations of intermediate email server 14 may include many additional features that are not illustrated in the example of FIG. 2. For instance, an actual implementation of intermediate email server 14 would include a power distribution system, a cooling system, and so on.

As illustrated in the example of FIG. 2, intermediate email server 14 includes a bus 30 that logically represents one or more buses that facilitate data communication between a processor 32, a data storage medium 34, and a network interface 36. For instance, bus 30 may represent a HyperTransport bus, an InfiniBand bus, a peripheral component interconnect (PCI) express bus, a universal serial bus (USB), or another type of bus.

In the example of FIG. 2, data storage medium 34 represents a logical collection of one or more volatile and/or non-volatile data storage media that are capable of storing data, including software instructions and application data. For instance, data storage medium 34 may represent one or more magnetic disks, optical discs, flash memory units, dynamic random access memory (RAM) units, RamBus RAM units, synchronous dynamic RAM units, or other types of data storage media.

Processor 32 is an integrated circuit that is capable of executing instructions. For example, processor 32 may be a microprocessor, an application-specific integrated circuit, a digital signal processor, a graphics processing unit, or another type of integrated circuit that is capable of executing instructions. For instance, processor 32 may be a Core processor manufactured by Intel Corporation of Santa Clara, Calif., or a K10 processor manufactured by Advanced Micro Devices, Inc. of Sunnyvale, Calif. Although not illustrated in the example of FIG. 2, intermediate email server 14 may include several such processors. Processor 32 may read data stored in data storage medium 34 by retrieving the data via bus 30. Moreover, processor 32 may write data to data storage medium 34 by sending the data to data storage medium 34 via bus 30.

Network interface 36 enables intermediate email server 14 to send data on network 18 and to receive data from network 18. For instance, network interface 36 may be an Ethernet network interface, a token ring network interface, a fiber optic network interface, a WiFi network interface, a WiMax network interface, or another type of wired or wireless network interface. When network interface 36 receives data from network 18, network interface 36 may store the data in data storage medium 34 by sending the data to data storage medium 34 via bus 30. Furthermore, processor 32 may send data via bus 30 to network interface 36 for transmission on network 18.

As illustrated in the example of FIG. 2, data storage medium 34 stores an operating system 38. For instance, data storage medium 34 may store a WINDOWS SERVER® operating system or a WINDOWS VISTA® operating system from Microsoft Corporation, a UNIX operating system, an OS X® operating system from Apple Inc. of Cupertino, Calif., a Linux operating system, or another type of operating system. When executed by processor 32, operating system 38 manages the sharing of resources of intermediate email server 14 and provides interfaces that other software applications can use to access those resources. For instance, a software application can use an interface provided by operating system 38 to send data through network interface 36 to network 18.

Furthermore, as illustrated in the example of FIG. 2, data storage medium 34 stores an email server application 40. When executed by processor 32, email server application 40 receives incoming email messages from network 18 and sends outgoing email messages to other email servers via network 18.

Email server application 40 may be subdivided into an incoming message module 42, a truncation module 44, a message retrieval module 46, and a message retrieval module 52. It should be appreciated that incoming message module 42, truncation module 44, message retrieval module 46, and message retrieval module 52 may share one or more common instructions. Furthermore, it should be appreciated that email server application 40 may include other modules in addition to incoming message module 42, truncation module 44, message retrieval module 46, and message retrieval module 52 and provide functionality in addition to the functionality provided by incoming message module 42, truncation module 44, message retrieval module 46, and message retrieval module 52. For instance, email server application 40 may include a module that filters out "spam" email messages.

When executed by processor 32, incoming message module 42 interacts with operating system 38 to receive incoming email messages that are received from network 18 by network interface 36. For instance, incoming message module 42 may use an interface provided by operating system 38 to configure a callback that causes operating system 38 to provide incoming email messages to incoming message module 42. When incoming message module 42 receives an incoming email message, incoming message module 42 may perform one or more email processing operations on the incoming email message. For instance, incoming message module 42 may determine whether the incoming email address includes a "to" header field, a "cc" header field, or a "bcc" header field that specifies an email address associated with an active account maintained by intermediate email server 14. In this example, incoming message module 42 may generate an outgoing "bounce" message when the "to" header field, the "cc" header field, or the "bcc" header field of the incoming email message specifies an email address associated with an inactive account that was previously maintained by intermediate email server 14.

After incoming message module 42 performs the email processing operations on the incoming email message, incoming message module 42 may store the incoming email message in a message database 50. Message database 50 may be a variety of different types of database. For instance, message database 50 may be a relational database, a file system, a file, an associative database, an object-oriented database, or another type of database. Storing the incoming email message in message database 50 may enable the incoming email message to be retrieved multiple times. After storing the incoming email message in message database 50, incoming message module 42 may provide the incoming email message to truncation module 44.

When executed by processor 32, truncation module 44 receives the incoming email message from incoming message module 42 and automatically generates a truncated email message that includes a current portion of the incoming email message and not the historical portion of the original email message. In some implementations, truncation module 44 may include a "truncated" header field in the truncated email message to indicate that the truncated email message is a truncation. An example operation of truncation module 44 is provided below with reference to FIG. 4.

After truncation module 44 generates the truncated email message, truncation module 44 may provide the truncated email message to transmission module 46. Upon receiving the truncated email message, transmission module 46 may use one or more software interfaces provided by operating system 38 to cause network interface 36 to send the truncated email message to receiving email server 16 for eventual delivery to client device 4B. It should be appreciated that in some implementations, the functionality of receiving email server 16 is merged into intermediate email server 14. In these implementations, transmission module 46 may use software interfaces provided by operating system 38 to cause network interface 36 to send the truncated email message directly to client device 4B.

In addition, when processor 32 executes message retrieval module 52, message retrieval module 52 may receive requests for original email messages. In response to a request for an original email message, message retrieval module 52 may search message database 50 for the original email message. When message retrieval module 52 identifies the original email message, message retrieval module 52 provides the original email message to transmission module 46. Upon receiving the original email message from message retrieval module 52, transmission module 46 may use operating system 38 to send the original email message to receiving email server 16 or client device 4B, depending on how communication system 2 is configured. In an alternate implementation, message retrieval module 52 may cause transmission module 46 to send only the historical portion of the original email message to receiving email server 16. When client device 4B receives the historical portion of the original email message, client device 4B may append the historical portion of the original email message to the truncated email message, thereby recovering the original email message.

Message retrieval module 52 may receive a request for an original email message for a variety of reasons. For example, client device 4B may receive a truncated email message that includes the current portion of the original email message, but not the historical portion of the original email message. In this example, user 10 of client device 4B may not immediately understand the context of the truncated email message without being able to read the historical portion of the original email message. Consequently, in this example, user 10 may instruct receiving client device 8 to request the original email message. When receiving client device 8 receives the original email message, receiving client device 8 may replace the truncated email message with the original email message.

As explained below, it should be appreciated that in some implementations, receiving client device 8 may use locally stored information to recover the original email message without sending a request for the original email message. In these implementations, message retrieval module 52 may be unnecessary.

Figure 3:
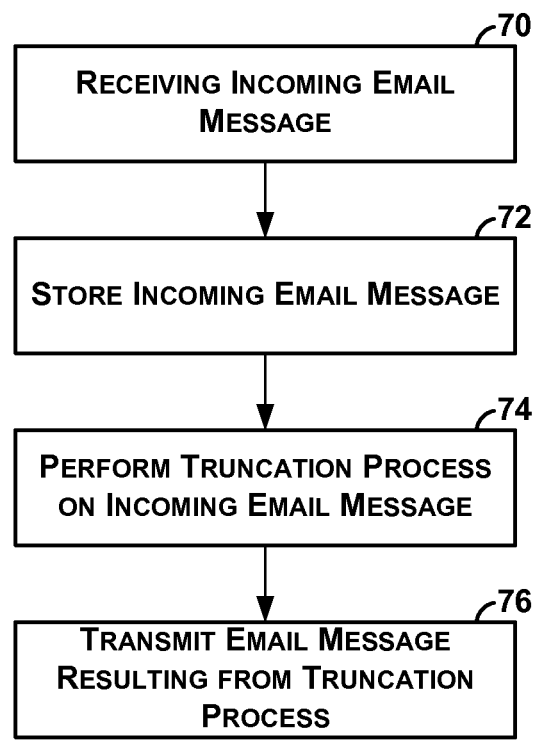
FIG. 3 is a flowchart illustrating an example operation of an email server application executing in the example intermediate email server of FIG. 2.

FIG. 3 is a flowchart illustrating an example operation of email server application 40. As illustrated in the example of FIG. 3, incoming message module 42 in email server application 40 receives an incoming email message (70). After incoming message module 42 receives the incoming email message, incoming message module 42 may store the incoming email message in message database 50 (72).

Next, truncation module 44 performs a truncation process on the incoming email message (74). An example truncation process is illustrated below with regard to FIG. 4. During the truncation process, truncation module 44 may generate a truncated email message that includes a current portion of the incoming email message and not a historical portion of the original email message. It should be appreciated that the email message that results from the truncation process may be the same as the incoming email message when the incoming email message does not include a historical portion. Furthermore, in some implementations, the email message that results from the truncation process may be the same as the incoming email message when the truncation process determines that removal of the historical portion of the incoming email message would be unnecessary or inappropriate.

After truncation module 44 performs the truncation process, transmission module 46 may cause network interface 36 to transmit the email message that results from the truncation process (76).

Figure 4:
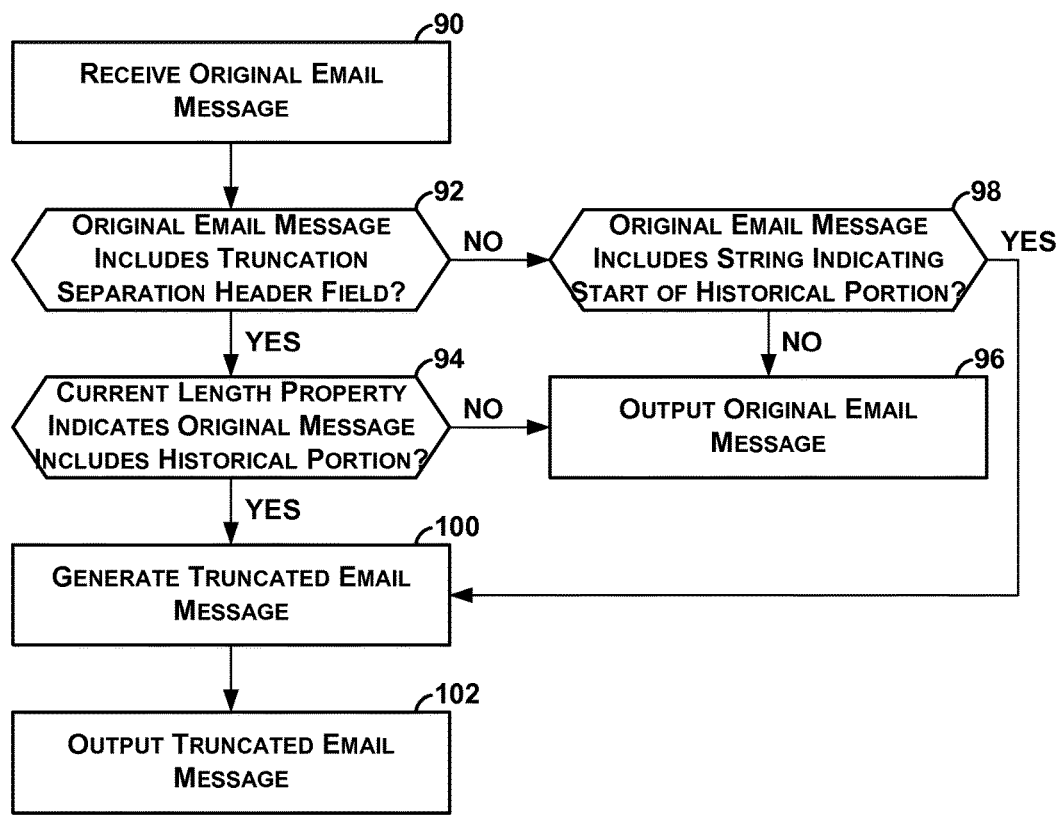
FIG. 4 is a flowchart illustrating an example operation of a truncation module in the email server application executing in the example intermediate email server of FIG. 2.

FIG. 4 is a flowchart illustrating an example operation of truncation module 44. As illustrated in the example of FIG. 3, truncation module 44 may receive an original email message from incoming message module 42 (90).

After receiving the original email message, truncation module 44 may determine whether the original email message includes a "portion partition" header field that identifies a start of a historical portion of the original email message (92). The "portion partition" header field may identify a start of the historical portion of the original email message in a variety of ways. For instance, the "portion partition" header field may identify a start of the historical portion of the original email message by indicating how many bytes are in the current portion of the original email message. In another instance, the "portion partition" header field may identify the last byte of the current portion of the original email message by indicating how many bytes are in the historical portion of the original email message.

If truncation module 44 determines that the original email message includes a "portion partition" header field ("YES" of 92), truncation module 44 may determine whether the "portion partition" header field indicates that the original message includes a historical portion (94). In one example implementation, truncation module 44 may determine that the "portion partition" header field indicates that the original message includes a historical portion when the "portion partition" header field does not indicate a null value. If truncation module determines that the "portion partition" header field indicates that the original email message does not include a historical portion ("NO" of 94), truncation module 44 may output the original email message to transmission module 46 (96).

If truncation module 44 determines that the original email message does not include a "portion partition" header field ("NO" of 92), truncation module 44 may determine whether the original email message includes a string indicative of a start of a historical portion of the original email message (98). The string may be a block of one or more characters that identifies recipients, a sent time, a sender, and a subject. For instance, consider the following original email message:

From: Justin
Sent: Monday, March 03, 2008 11:42 AM
To: Kelly
Subject: RE: Lunch?
Sure. Let's go to Mario's at 12:30.
---
From: Kelly
Sent: Monday, March 03, 2008 11:38 AM
To: Justin
Subject: Lunch?
Do you want to get lunch today?

In this example, the string "From: Kelly Sent: Monday, Mar. 3, 2008 11:38 AM To: Justin Subject: Lunch?" is indicative of the start of the historical portion of the original email message. In another instance, client device 4A may be configured to automatically insert a string of one or more visible or invisible characters in the original email message that always indicate an end of the current portion of the original email message and the beginning of the historical portion of the original email message.

If truncation module 44 determines that the original email message does not include a string indicative of the start of a historical portion of the original email message ("NO" of 98), truncation module 44 may output the original email message to transmission module 46 (96).

If truncation module 44 determines that the original email message includes a string indicative of the start of a historical portion of the original email message ("YES" of 98) or if truncation module 44 determines that the "portion partition" header field of the original email message indicates that the original email message includes a historical portion ("YES" of 94), truncation module 44 may generate a truncated email message that includes the current portion of the original email message, but not the historical email portion of the original email message (100). When truncation module 44 generates the truncated email message, truncation module 44 may include a "truncation" header field in the truncated email message that indicates that the truncated email message is a truncation of an original email message. After generating the truncated email message, truncation module 44 may output the truncated email message to transmission module 46 (102).

It should be appreciated that the operation illustrated in FIG. 4 is provided as one example operation of truncation module 44 among many possible operations. For instance, some operations of truncation module 44 may not use a string to identify a start of a historical portion of an original email message. Other operations of truncation module 44 may not use a "portion partition" header field.

Figure 5:
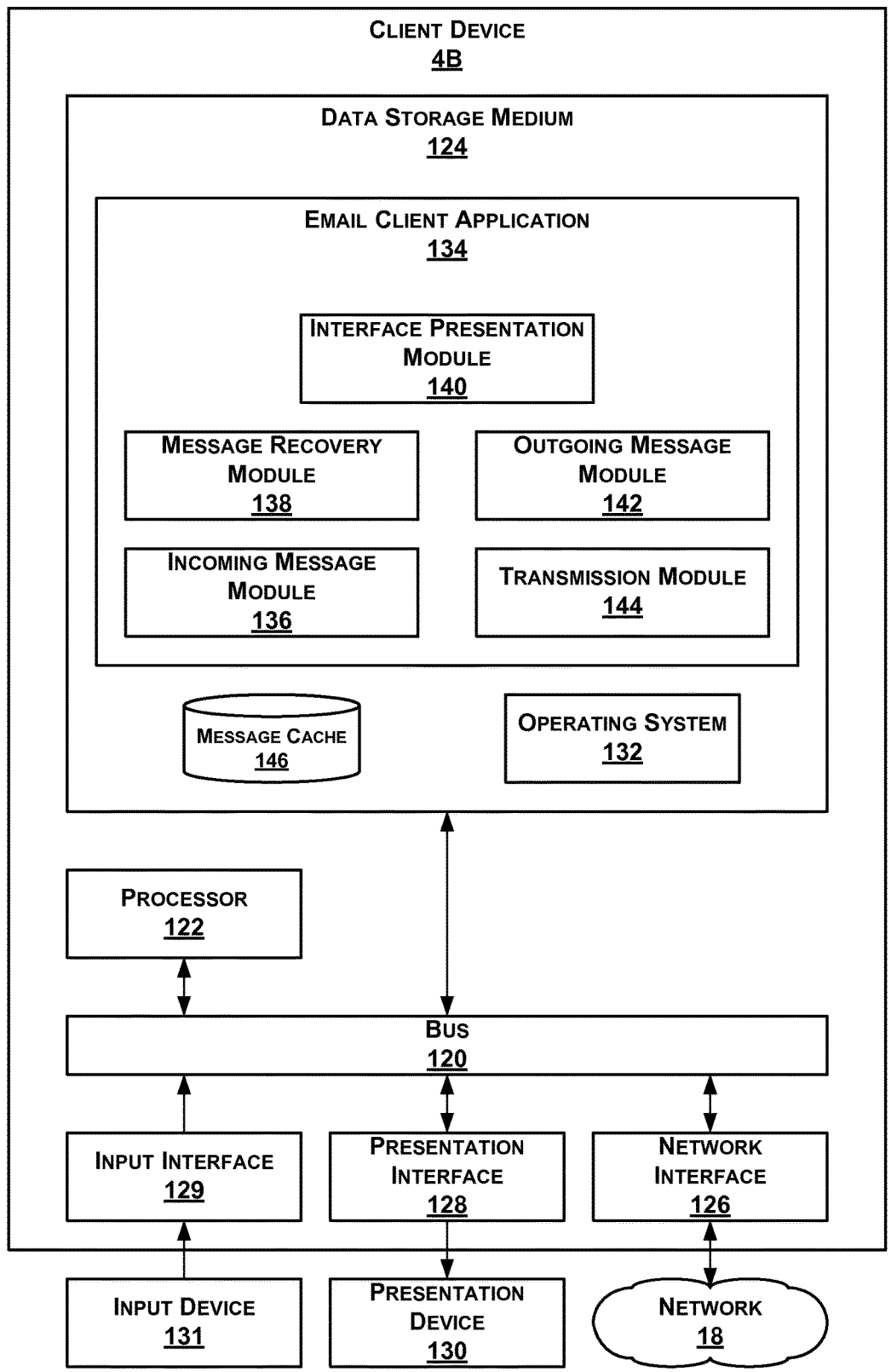
FIG. 5 is a block diagram illustrating example details of the receiving client device illustrated in the example of FIG. 1.

FIG. 5 is a block diagram illustrating example details of client device 4B. As illustrated in the example of FIG. 5, client device 4B includes a bus 120 that facilitates data communication between a processor 122, a data storage medium 124, a network interface 126, a presentation device 128, and an input interface 129. For instance, bus 120 may represent a HyperTransport bus, an InfiniBand bus, a peripheral component interconnect (PCI) express bus, a universal serial bus (USB), or another type of bus.

In the example of FIG. 5, data storage medium 124 represents a logical collection of one or more volatile and/or non-volatile data storage media that are capable of storing data, including software instructions and application data. For instance, data storage medium 34 may represent one or more magnetic disks, optical discs, flash memory units, dynamic random access memory (RAM) units, RamBus RAM units, synchronous dynamic RAM units, or other types of data storage media.

Processor 122 is an integrated circuit that is capable of executing instructions. For example, processor 32 may be a microprocessor, an application-specific integrated circuit, a digital signal processor, a graphics processing unit, or another type of integrated circuit that is capable of executing instructions. Processor 122 may read data stored in data storage medium 124 by retrieving the data via bus 120. Moreover, processor 122 may write data to data storage medium 34 by sending the data to data storage medium 124 via bus 120.

Network interface 126 enables client device 4B to send data on network 18 and to receive data from network 18. For instance, network interface 36 may be an Ethernet network interface, a token ring network interface, a fiber optic network interface, a WiFi network interface, a WiMax network interface, or another type of wired or wireless network interface. When network interface 126 receives data from network 18, network interface 126 may store the data in data storage medium 124 by sending the data to data storage medium 124 via bus 120. Furthermore, processor 122 may send data via bus 120 to network interface 126 for transmission on network 18.

Presentation interface 128 enables client device 4B to output data to be presented on a presentation device 130. For instance, presentation device 130 may be a monitor and presentation interface 128 enables client device 4B to output data to be displayed on this monitor. In another instance, presentation device 130 may be a speaker and presentation interface 128 enables client device 4B0 to output data to be played on the speaker.

Input interface 129 enables client device 4B to receive user input from an input device 131. Input device 131 may be a wide variety of different types of user input devices. For instance, input device 131 may be a keyboard, a mouse, a touch-sensitive screen, a microphone, a button array, a trackball, an electronic drawing pad, a gaming controller, or another type of input device.

As illustrated in the example of FIG. 5, data storage medium 124 stores an operating system 132. For instance, data storage medium 124 may store a WINDOWS VISTA® operating system from Microsoft Corporation, a UNIX operating system, an Apple OS X® operating system, a Linux operating system, or another type of operating system. When executed by processor 122, operating system 132 manages the sharing of resources of client device 4B and provides software interfaces that other software applications can use to access those resources.

Furthermore, as illustrated in the example of FIG. 5, data storage medium 124 stores an email client application 134. When executed by processor 122, email client application 134 receives incoming email messages from receiving email server 16 via network 18 and sends outgoing email messages to receiving email server 16 via network 18.

Email client application 134 may be subdivided into an incoming message module 136, a message recovery module 138, an interface presentation module 140, an outgoing message module 142, and a transmission module 144. It should be appreciated that the illustrated modules of email client application 134 may share one or more common instructions. Furthermore, it should be appreciated that email client application 134 may include other modules in addition to the illustrated modules and provide functionality in addition to the functionality provided by the illustrated modules.

When executed by processor 122, incoming message module 136 receives incoming email messages from receiving email server 16. In one example implementation, incoming message module 136 may use a software interface provided by operating system 132 to receive incoming email messages received by network interface 126. Incoming message module 136 may receive incoming email messages that have been truncated and incoming email messages that are still in their original forms. Upon receiving an incoming email message, incoming message module 136 may store the incoming email message in a message cache 146.

Interface presentation module 136, when executed by processor 122, uses one or more software interfaces provided by operating system 132 to cause presentation interface 128 to present a user interface on presentation device 130. The user interface may be a wide variety of user interfaces. For instance, the user interface may be a graphical user interface, a command-line interface, or another type of user interface. The user interface may display email messages stored in message cache 146. The user interface enables user 10 to read email messages stored in message cache 146.

Prior to presenting an email message in the user interface, interface presentation module 136 may determine whether the email message is a truncated email message. Interface presentation module 136 may determine whether the email message is a truncated email message in a variety of ways. For example, interface presentation module 136 may determine that the email message is a truncated email message when the email message includes a "truncation" header field that indicates that the email message is a truncated email message. In a second example, interface presentation module 136 may determine that the email message is a truncated email message when the subject header field of the email message includes a prefix that indicates that the email message is a reply to or a forward of an earlier email message and when the email message does not include a string that is indicative of the start of a historical portion of an email message.

When interface presentation module 136 determines that the email message is a truncated email message, interface presentation module 136 may be configured to do one of several things. For example, interface presentation module 136 may be configured to automatically instruct message recovery module 138 to recover an original email message of the truncated email message. In a second example, interface presentation module 140 may be configured to present an icon in the user interface that, when selected by user 10 using input device 131, causes interface presentation module 140 to instruct message recovery module 138 to recover an original email message of the truncated email message. In a third example, interface presentation module 140 may be configured to instruct message recovery module 138 to recover an original email message of the truncated email message when user 10 uses input device 131 to scroll past a certain point in the truncated email message as presented in the user interface.

Message recovery module 138, when executed by processor 122, performs an operation to recover an original email message of a truncated email message. An example operation to recover the original email message is provided with reference to FIG. 6, below. After message recovery module 138 recovers the original email message, message recovery module 138 may replace the copy in message cache 142 of the truncated email message with the original email message. Interface presentation module 140 may then cause presentation module 128 to present the original email message on presentation device 130.

When executed by processor 122, outgoing message module 142 enables user 10 to create a new outgoing email message. For instance, the user interface provided by interface presentation module 140 may include an icon or a command that, when selected, instructs interface presentation module 140 to present a user interface that enables user 10 to compose an outgoing email message. When user 10 is finished composing the outgoing email message and inputs a command to send the outgoing email message, outgoing message module 142 may determine whether the outgoing email message includes a current portion and a historical portion. User 10 may use input device 131 to input the command to send the outgoing email message. If the outgoing email message includes a current portion and a historical portion, outgoing message module 142 may include in the outgoing email message a "portion partition" header field that indicates a start of the historical portion of the outgoing email message. After outgoing message module 142 includes the "portion partition" header field in the outgoing email message, outgoing message module 142 may instruct transmission module 144 to send the outgoing email message to receiving email server 16.

In some implementations, client device 4A may execute an instance of email client application 134 and may send and receive email messages in the manner described above for client device 4B. Furthermore, in some implementations, a web server may execute an instance of email client application 134. In these implementations, the web server may also execute an instance of a web application that enables client device 4B to send and receive email message through a web browser interface.

Figure 6:
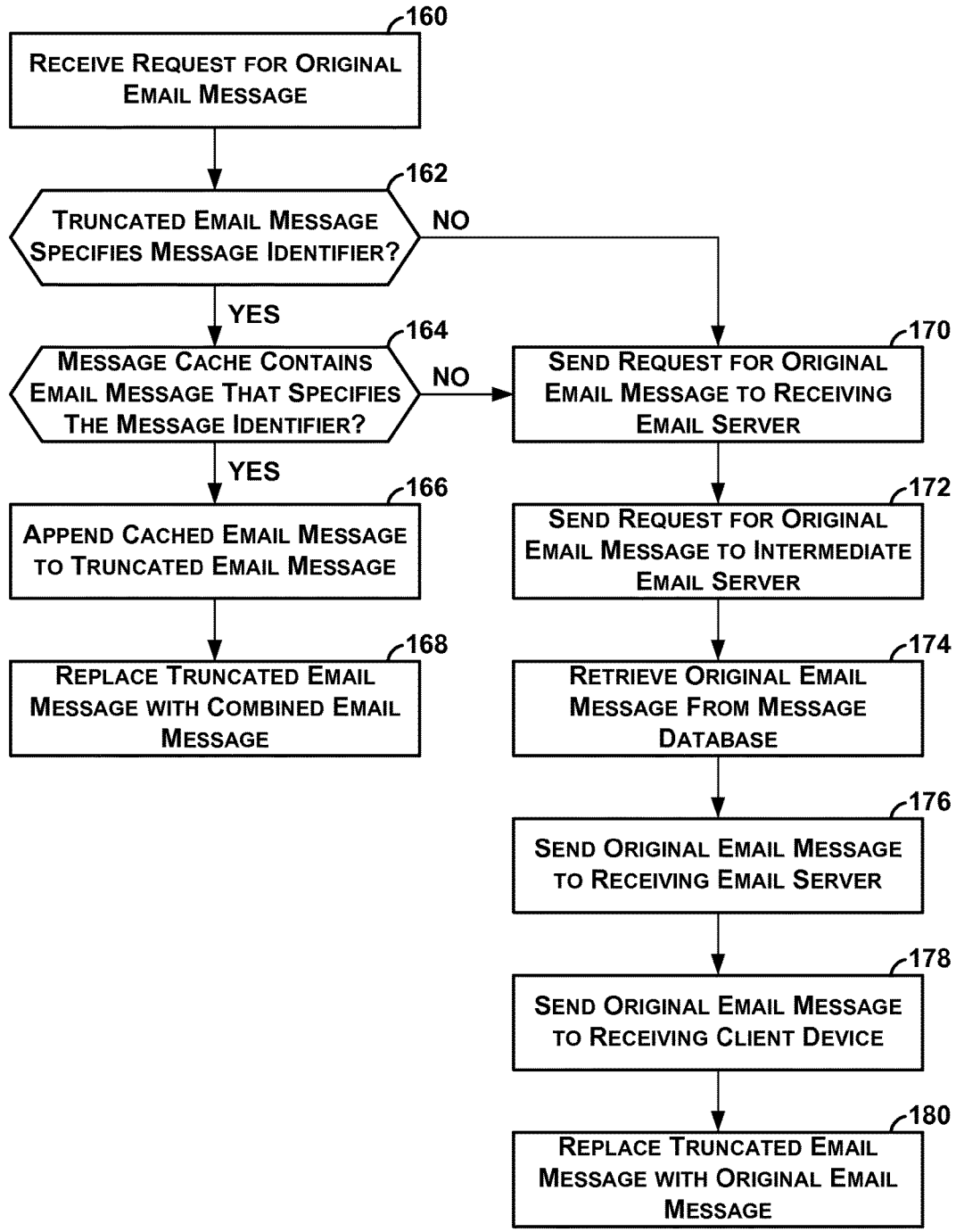
FIG. 6 is a flowchart illustrating an example operation to recover an original email message.

FIG. 6 is a flowchart illustrating an example operation to recover an original email message. In the example of FIG. 6, message recovery module 138 may originally receive a request for an original email message associated with a truncated email message received by client device 4B (160). After message recovery module 138 receives the request for the original email message, message recovery module 138 may determine whether the truncated email message includes a reference header field that specifies a message identifier that identifies an earlier email message (162). A reference header field is a header field of an email message that defines a relationship with another email message. For instance, Internet Engineering Task Force (IETF) Request For Comment (RFC) 2822 specifies that email messages may include "in-reply-to" header fields and "references" header fields that specify message identifiers of other email messages.

If message recovery module 138 determines that the truncated email message specifies a message identifier that identifies an earlier email message ("YES" of 162), message recovery module 138 may determine whether message cache 146 stores an email message that specifies the message identifier (164). For instance, message recovery module 138 may determine whether any email message in message cache 146 includes a "message identifier" header field that specifies the message identifier specified by the "in-reply-to" header field of the truncated email message.

If message recovery module 138 determines that message cache 146 stores an email message that specifies the message identifier ("YES" of 164), message recovery module 138 may append the stored email message to the truncated email message, thereby reassembling the original email message (166). After appending the stored email message to the truncated email message, message recovery module 138 may replace the truncated email message with the recovered original email message (168). Interface presentation module 140 may then present the original email message on the user interface.

On the other hand, if message cache 146 does not store an email message that specifies the message identifier ("NO" of 164) or if the truncated email message does not specify a message identifier that identifies an earlier email message ("NO" of 162), message recovery module 138 may send a request for the original email message to receiving email server 16 (170). In response to the request, receiving email server 16 may send a request for the original email message to intermediate email server 14 (172). When intermediate email server 14 receives the request, message retrieval module 52 may retrieve the original email message from message database 50 (174). Upon retrieving the original email message, message retrieval module 52 may cause transmission module 46 to send the original email message to receiving email server 16 (176). When receiving email server 16 receives the original email message, receiving email server 16 sends the original email message to client device 4B (178). Message recovery module 138 may then replace the truncated email message with the original email message (180).

The operation illustrated in the example of FIG. 6 is merely one example operation among many possible operations to recover an original email message. For instance, other example operations may use other properties and characteristics of email messages to recover original email messages.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable media and executed by processors. The memory unit may be implemented within the processor or external to the processor, in which case it can be communicatively coupled to the processor via various means as is known in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising:
a data storage medium that stores instructions; and
a processor to execute the instructions, which causes the computing device to:
  receive a truncated message, the truncated message including a current portion;
  determine, by the computing device, whether the truncated message includes a message identifier that identifies a historical portion associated the truncated message;
  when the truncated message does not include any message identifier that identifies the historical portion, send a request for an untruncated message to a message server;
  when the truncated message includes a message identifier that identifies the historical portion:
    determine, by the computing device, whether the historical portion is stored;
    generate a combined message by appending the historical portion to the truncated message; and
    replace the truncated message with the combined message.

2. The computing device of claim 1, further comprising:
when there is no historical portion, sending a request for the untruncated message to a message server.

3. The computing device of claim 1, further comprising:
when there is no historical portion, sending a request for the untruncated message to a message server.

4. The computing device of claim 1, wherein the truncated message includes a plurality of header fields.

5. The computing device of claim 4, wherein a portion partition header field of the plurality of header fields identifies the historical portion.

6. The computing device of claim 4, wherein a message identifier header field of the plurality of header fields identifies the historical portion.

7. The computing device of claim 4, wherein an in-reply-to header field of the plurality of header fields identifies the historical portion.

8. The computing device of claim 4, wherein a references header field of the plurality of header fields identifies the historical portion.

9. A method comprising:
receiving a truncated message, the truncated message including a current portion;
determining, by a computing device, whether the truncated message includes a message identifier that identifies a historical portion;
when the computing device determines that the truncated message does not include any message identifier that identifies the historical portion, sending a request for an untruncated message to a message server;
when the computing device determines that the truncated message includes a message identifier that identifies the historical portion:
  determining, by the computing device, whether the historical portion is stored;
  generating a combined message by appending the historical portion to the truncated message; and
  replacing the truncated message with the combined message.

10. The method of claim 9, further comprising:
when there is no historical portion, sending a request for the untruncated message to a message server.

11. The method of claim 9, further comprising:
when there is no historical portion, sending a request for the untruncated message to a message server.

12. The method of claim 9, wherein the header includes a portion partition header field that identifies the historical portion.

13. A computing device comprising:
a data storage medium that stores instructions;
a processor; and
a client application including:
  an incoming message module operable to receive a message, determine whether message is a truncated message, and to determine whether the truncated message includes a message identifier that identifies a historical portion associated with the truncated message; and
  a message recovery module operable to send a request for an untruncated message when the truncated message does not include any message identifier that identifies the historical portion; and when the truncated message includes a message identifier that identifies the historical portion: the message recovery module operable to determine whether the historical portion associated with the truncated message is stored as a cached message, and generate a combined message by appending the historical portion to the truncated message when the historical portion associated with the truncated message is stored as the cached message.

14. The computing device of claim 13, wherein the message recovery module is further operable to send a request for an original message to a message server when there is no historical portion.

15. The computing device of claim 13, wherein the message recovery module is further operable to send a request for the untruncated message to a message server when there is no historical portion.

16. The computing device of claim 13, wherein the historical portion associated with the truncated message is identified in a header field associated with the truncated message.

17. The computing device of claim 13, wherein the historical portion is excluded from the truncated message.

* * * * *